United States Patent
Griffiths et al.

(10) Patent No.: US 10,205,585 B2
(45) Date of Patent: Feb. 12, 2019

(54) SYSTEMS AND METHODS FOR ANALOG CANCELLATION FOR DIVISION FREE DUPLEXING FOR RADIOS USING MIMO

(71) Applicant: Huawei Technologies Co., Ltd., Shenzhen (CN)

(72) Inventors: James Gary Griffiths, Braeside (CA); Wolfgang Oberhammer, Ottawa (CA); Michael Moher, Stittsville (CA); Eddy Shi-Ning Hum, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 122 days.

(21) Appl. No.: 14/496,850

(22) Filed: Sep. 25, 2014

(65) Prior Publication Data

US 2016/0094332 A1 Mar. 31, 2016

(51) Int. Cl.
*H04L 5/14* (2006.01)
*H04B 1/10* (2006.01)
*H04B 1/12* (2006.01)
*H04B 1/525* (2015.01)

(52) U.S. Cl.
CPC ........... *H04L 5/1461* (2013.01); *H04B 1/109* (2013.01); *H04B 1/123* (2013.01); *H04B 1/525* (2013.01)

(58) Field of Classification Search
None
See application file for complete search history.

(56) References Cited

U.S. PATENT DOCUMENTS

| 5,428,831 A * | 6/1995 | Monzello | H04B 1/126 455/278.1 |
| 2008/0242245 A1* | 10/2008 | Aparin | H04B 1/525 455/126 |
| 2008/0279122 A1 | 11/2008 | Fukuda et al. | |
| 2013/0102254 A1* | 4/2013 | Cyzs | H04B 1/126 455/63.1 |
| 2013/0215805 A1* | 8/2013 | Hong | H04B 15/00 370/281 |

(Continued)

FOREIGN PATENT DOCUMENTS

| CN | 2826837 Y | 10/2006 |
| CN | 101304259 A | 11/2008 |
| CN | 104008415 A | 8/2014 |

*Primary Examiner* — George C Atkins
(74) *Attorney, Agent, or Firm* — Slater Mastil, LLP (57) ABSTRACT

System and method embodiments are provided for analog cancellation for division free duplexing for radios using MIMO. In an embodiment, a system for minimizing transmitted signals from a transmitter appearing at a co-located receiver in a division free duplexing radio includes a transmitter to transmit an analog transmitted signal; an antenna; a circulator coupled to the transmitter and the antenna; a tuning algorithm component configured to receive a copy of the analog transmitted signal from the transmitter and a sampled analog received signal from a received signal path from the circulator, wherein the sampled analog received signal is sampled at a point in the received signal path before the analog received signal is provided to a receiver; and a multitap cancellation component configured to provide a cancellation signal to couple to the analog received signal such that an amount of the analog transmitted signal appearing at the receiver is reduced.

19 Claims, 5 Drawing Sheets

(56) References Cited

U.S. PATENT DOCUMENTS

| | | | |
|---|---|---|---|
| 2013/0301488 A1 | 11/2013 | Hong et al. | |
| 2014/0204808 A1* | 7/2014 | Choi | H04L 5/143 |
| | | | 370/278 |
| 2014/0269864 A1* | 9/2014 | Aparin | H04B 1/40 |
| | | | 375/221 |
| 2014/0348032 A1* | 11/2014 | Hua | H04B 1/44 |
| | | | 370/277 |
| 2015/0065058 A1* | 3/2015 | Wang | H04B 15/00 |
| | | | 455/63.1 |
| 2015/0078226 A1* | 3/2015 | Charlon | H04B 1/525 |
| | | | 370/290 |
| 2016/0226653 A1* | 8/2016 | Bharadia | H04B 1/525 |
| 2016/0285504 A1* | 9/2016 | Hua | H04B 1/123 |
| 2017/0041060 A1* | 2/2017 | Kim | H04B 15/02 |

* cited by examiner

SYSTEMS AND METHODS FOR ANALOG CANCELLATION FOR DIVISION FREE DUPLEXING FOR RADIOS USING MIMO

TECHNICAL FIELD

The present invention relates to a system and method for wireless communications, and, in particular embodiments, to a system and method for interference avoidance for division free duplexing in multiple input multiple output radio systems.

BACKGROUND

Currently, many wireless radios use frequency division duplex (FDD) or time division duplex (TDD) to avoid interference between the transmitted signal and the received signal. In cellular communication, the sensitivity to interference is aggravated by the fact that the transmit power is many orders of magnitude larger than the received signal strength, making the receiver susceptible to co-located transmitter noise and signal leaking into the receiver front end.

Digitally generated cancellation systems create an inverted duplicate of the baseband deterministic signal appearing at the transmit baseband digital interface and up convert this signal to radio frequency (RF) to provide "active" signal cancellation. However, this method does not adequately address the transmitter broadband noise or non-linearities created by downstream RF analog transmit components leaking into the receiver.

Modern cellular base station radios, WiFi, and other wireless systems employ a technology commonly referred to as MIMO (multiple-input, multiple-output), where multiple transmitters and/or receivers operating at the same frequency increase the capacity of the link. This system exacerbates the leak problem since multiple transmitters are leaking into any given receiver. This leak problem is further aggravated by the fact that newer generation cellular technologies (e.g., 5G) employ division free duplexing in which the transmitter transmits at the same time and on the same frequency that the receiver receives signals.

SUMMARY OF THE INVENTION

In accordance with an embodiment, a system for minimizing transmitted signals from a co-located transmitter appearing at a co-located receiver division free duplexing radio includes a transmitter to transmit an analog transmitted signal; an antenna; a circulator coupled to the transmitter and to the antenna; a tuning algorithm component configured to receive a copy of the analog transmitted signal from the transmitter and a sampled analog received signal from a received signal path from the circulator, wherein the sampled analog received signal is sampled at a point in the received signal path before the analog received signal is provided to a receiver; and a multitap cancellation component configured to provide a cancellation signal to couple to the analog received signal such that an amount of the analog transmitted signal appearing at the receiver is reduced.

In accordance with another embodiment, a network component configured for division free duplexing in a wireless network includes a processor; transmitter coupled to the processor to transmit an analog transmitted signal as instructed by the processor; an antenna; a circulator coupled to the transmitter and to the antenna; a tuning algorithm component configured to receive a copy of the analog transmitted signal from the transmitter and a sampled analog received signal from a received signal path from the circulator, wherein the sampled analog received signal is sampled at a point in the received signal path before the analog received signal is provided to a receiver; and a multitap cancellation component configured to provide a cancellation signal to couple to the analog received signal such that an amount of the analog transmitted signal appearing at the receiver is reduced.

In accordance with another embodiment, a method for cancelling a transmitted signal from a received signal in a division free duplexing network component includes sampling an analog transmitted signal; sampling an analog received signal; determining with the network component gain and phase adjust values by which to modify the analog transmitted signal; modifying with a cancellation component in the network component the analog transmitted signal to produce a cancellation signal according the gain and phase adjust values; and adding the cancellation signal to the analog received signal at a point in a received signal path between an antenna and a receiver.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Not withstanding Code Division Multiple Access (CDMA), bands for cellular phone service and other bidirectional wireless services have been operated in either FDD mode (i.e., transmitter and receiver are on all the time, but tuned to different frequencies) or TDD mode (i.e., transmitter and receiver on the same frequency but at different times). To realize capacity increases, a new concept being develop is Full Duplex mode, wherein the transmitter and receiver are on simultaneously and on the same frequency. This presents challenges in isolating the transmitter power, usually several watts, from its on frequency, co-located receiver, in order to ensure the receiver is not overloaded and de-sensitized.

Disclosed herein are systems, methods, and apparatuses for analog cancellation for division free duplexing for radios using MIMOs. In an embodiment, a method of sampling multiple transmitters in a MIMO system in order to provide analog RF cancellation for each receiver in a MIMO system is provided. Since the method samples the actual RF transmit signal after the power amplifier, it can be used to mitigate broadband noise and non linearities as well as provide linear signal cancellation. In an embodiment, in a high dynamic range system, such as cellular, the disclosed methods, systems and apparatuses are used as the first cancellation method (to limit overload and desensitization) followed by a baseband DSP generated "active" analog and digital domain cancellation. In an embodiment, in a lower dynamic range wireless system, the disclosed methods, systems, and apparatuses may be sufficient to be used as a standalone transmit leak mitigation measure. In an embodiment, since the system exists as a closed loop feedback system, the disclosed system is capable of adapting to changes in environment, such as, for example, changes in temperature or multipath induced parametric changes. In an embodiment method, MIMO radios employing division free duplexing (i.e., full duplex mode) are used to mitigate transmitter noise and signal leak into co-located MIMO receivers, thereby increasing the capacity of the link in a MIMO system.

A cellular radio or WiFi access point (AP) commonly has N transmitters and M receivers, known as an N×M MIMO radio. Interference cancellation can be applied to the radios with multiple transmitters and receivers. Every receiver samples each transmitter as well as its own receiver input and feeds this back to the processing block. Therefore, in an embodiment, a sampling path exists from each transmitter and also from the receiver in question. Each transmitter transmits on its own antenna. There is a multitap phase/amplitude/delay block inserted between the sampled analog transmit RF path and its own analog receiver path.

Embodiments of the disclosed systems, methods, and apparatuses provide high isolation of transmitter power from on frequency co-located receives, which, therefore, allows operation in Full Duplex (FD) mode. The disclosed systems, methods, and apparatuses are extendable to any N×M MIMO system and adapts to changes in its environment (e.g., changes to antenna impedance due to temperature or due to reflections because of moving objects nearby). The disclosed systems, methods, and apparatuses are simpler than a balanced system (i.e., a system that requires split RF paths 180 degrees out of phase) and does not require both polarizations of a dual polarization antenna to operate, leaving the second polarization for MIMO use, thereby providing significant additional channel capacity per antenna, per polarization. Additional channel capacity provides higher overall data rates, which equates to more customers and more revenue for wireless service providers. Furthermore, the disclosed systems, methods, and apparatuses have a lower insertion loss in both transmit and receive paths (e.g., little or no power lost in splitter/combiner arms) due to a minimum number of components in the critical transmit and receive paths as compared to other methods.

In an embodiment, a system for minimizing transmitted signals from a transmitter appearing at a co-located receiver in a division free duplexing radio includes a transmitter to transmit an analog transmitted signal, an antenna, a circulator coupled to the transmitter and to the antenna, a tuning algorithm configured to receive a copy of the analog transmitted signal from the transmitter and a sampled received signal from a received signal path from the circulator, wherein the sampled analog received signal is sampled at a point in the received signal path before the analog received signal is provided to a receiver, and a multitap cancellation component configured to provide a cancellation signal to couple to the analog received signal such that an amount of the analog transmitted signal appearing at the receiver is reduced. In an embodiment, there are included a multitap cancellation component for each of a plurality of transmitters per received channel in order to reduce or eliminate the components of a received signal due to reflection or coupling to the transmitted signal. In an embodiment, the transmitted signal and the received signal are transmitted and received on the same carrier frequency. In an embodiment, the system includes a cancellation coupling component (e.g., a tuning algorithm component or a channel estimator) coupled to an output of the multitap and to the received signal path. The multitap cancellation component is configured to receive a copy of the analog transmitted signal and to receive gain and phase adjust values from the tuning algorithm, and from those inputs to provide a cancellation signal according to the analog transmitted signal and the gain and phase adjust values to a cancellation coupling component that couples (e.g., adds) the cancellation signal to the analog received signal.

Figure 1:
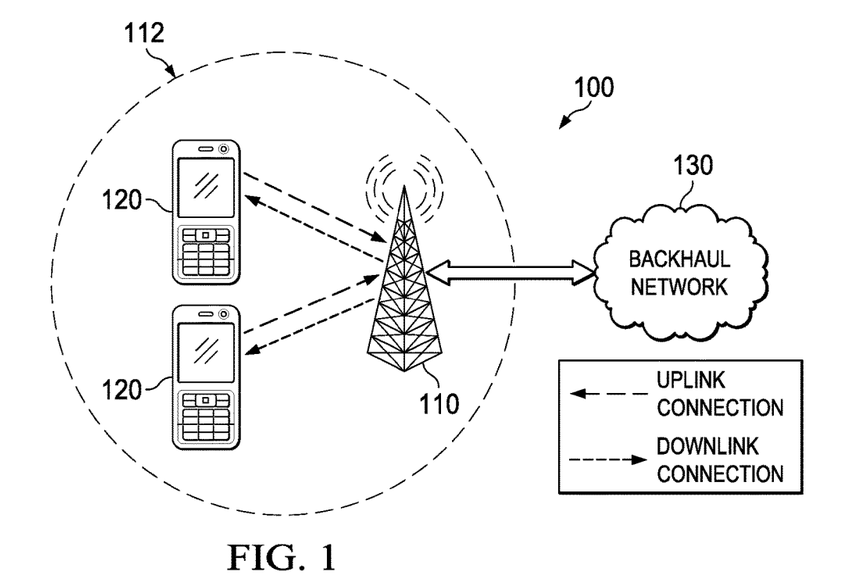
FIG. 1 illustrates a network for communicating data.

FIG. 1 illustrates a network 100 for communicating data. The network 100 comprises an access point (AP) 110 having a coverage area 112, a plurality of user equipment (UEs) 120, and a backhaul network 130. As used herein, the term AP may also be referred to as a TP and the two terms may be used interchangeably throughout this disclosure. The AP 110 may comprise any component capable of providing wireless access by, inter alia, establishing uplink (dashed line) and/or downlink (dotted line) connections with the UEs 120, such as a base transceiver station (BTS), an enhanced base station (eNB), a femtocell, and other wirelessly enabled devices. The UEs 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc.

In an embodiment, the AP 110 and UEs 120 are configured to operate in FD mode. In order to provide high isolation of transmitter power from on frequency co-located receivers in the AP 110, the AP 110 includes a self-interference cancellation system or circuit described in more detail below. In an embodiment, the AP 110 is a cellular AP. In another embodiment, the AP 110 is a WiFi AP.

Figure 2:
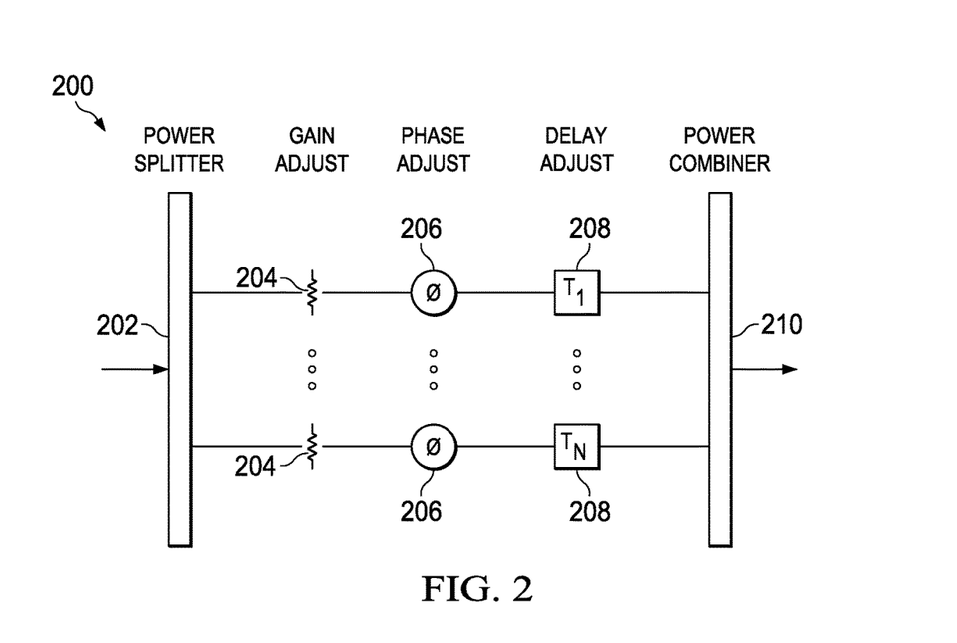
FIG. 2 is a schematic diagram illustrating a typical multitap cancellation system.

FIG. 2 is a schematic diagram of an embodiment multitap cancellation block 200. Multitap cancellation block includes a power splitter 202, a plurality of gain adjust components 204, a plurality of phase adjust components 206, a plurality of delay adjust components 208, and a power combiner 210. Each of the gain adjust components 204, phase adjust components 206, and delay adjust components 208 may be implemented discretely or as a vector modulator and delay line. In an embodiment, the magnitude of the gain for each of the gain adjust components is different. In an embodiment, the magnitude of the phase for each of the phase adjust components is different. In an embodiment, the magnitude of the delay for each of the delay adjust components is different.

Figure 3:
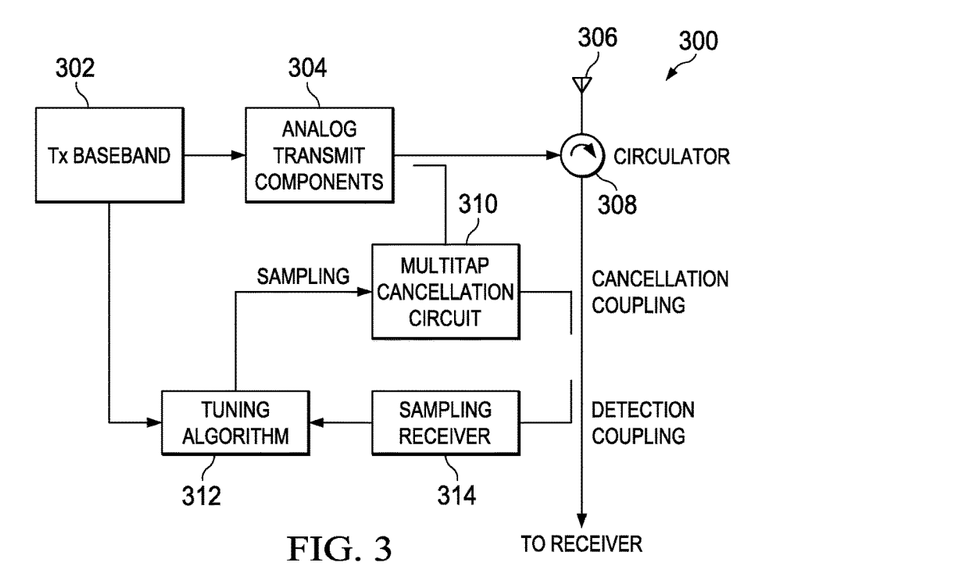
FIG. 3 is a schematic diagram of an embodiment cancellation system for a simple single input single output (SISO) system.

FIG. 3 is a schematic diagram of an embodiment cancellation system 300 for a simple single input single output (SISO) case. Cancellation system 300 includes a transmitter (Tx) baseband 302, analog transmit components 304, an antenna 306, a circulator 308, a multitap cancellation circuit 310, a tuning algorithm 312, and a sampling receiver 314. The components of cancellation system 300 may be arranged as shown in FIG. 3. In an embodiment, the multitap cancellation circuit is implemented as multitap cancellation block 200 depicted in FIG. 2. The transmission signal is transmitted from the Tx baseband 302 to analog transmit components 304 and then to circulator 308. In an embodiment, the circulator 308 is a three-port device that transmits a signal entering any port to the next port in rotation only. Thus, the transmit signal received from the analog transmit components 304 is transmitted to the antenna 306 by the circulator 308. The antenna 306 broadcasts the transmit signals to other devices (not shown). The antenna 306 also receives signals from other devices and transmits the received signals to the circulator 308 which transmits the received analog signal to the receiver (not shown). The duplexing function to provide FD mode for the device is provided by the circulator 308. The circulator 308 has intrinsic isolation limits due to the ability to match the antenna port of the circulator to the transmission line impedance. Reflections due to mismatch outboard of the antenna port of the circulator 308 show up on the receiver port of the circulator 308, the largest of these being the antenna reflection.

A sampling receiver 314 is coupled to the receiver port of the circulator 308 to sample the received analog signal that is transmitted to the receiver. The sampled received analog signal is transmitted by the sampling receiver 314 to the tuning algorithm. The baseband transmission signal from Tx baseband 302 is sampled and also transmitted to the tuning algorithm component 312. The Tuning algorithm component 312 derives an error function which is used to drive the amplitude, phase, and/or delay controls of each tap in multitap cancellation circuit 310 in such a way as to minimize the transmit signal appearing at the receiver. The multitap cancellation circuit 310 samples the transmit signal coming from the analog transmit components 304 and using the amplitude and phase controls from the tuning algorithm 312 adjusts modifies the transmit signal and adds the modified transmit signal back into the receive path in such a manner as to significantly reduce the transmitter lead at the receiver. In an embodiment, it is not necessary to provide for variable delay, but rather the delay in each tap may be different and of the same order of magnitude as the actual path delays associated with the various reflections appearing in the antenna path.

The output of the multitap cancellation circuit 310 is a cancellation signal that is added to or coupled to the received signal to reduce or eliminate the transmitted signal (e.g., transmitted signal reflections) from appearing in the received signal at the receiver. The adding or coupling of the cancellation signal is performed at a point in the received signal path that is between the circulator and the point in the received signal path that sampling of the received signal occurs. Also, sampling of the received signal is performed at a point in the received signal path that is between the circulator and the receiver.

Figure 4:
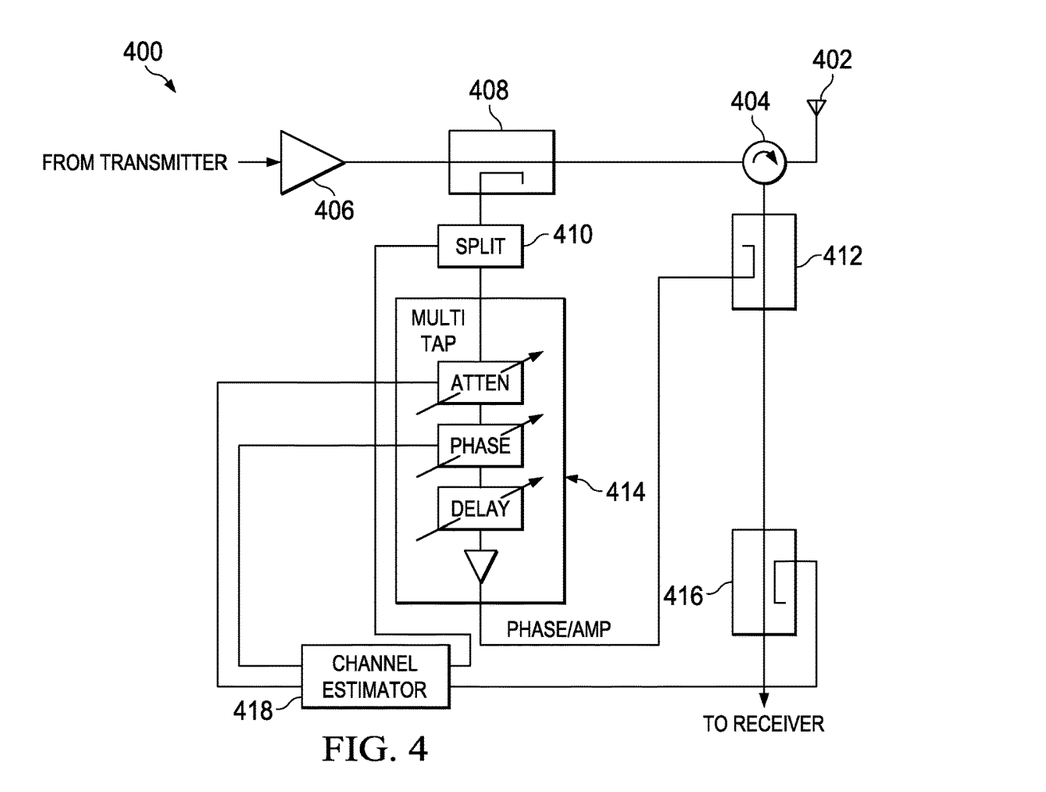
FIG. 4 is a schematic diagram of an another embodiment cancellation system for a SISO system.

FIG. 4 is a schematic diagram of another embodiment cancellation system 400 for a simple single input single output (SISO) case. Cancellation system 400 includes a Tx power amplifier 406, a circulator 404, an antenna 402, a transmission signal sampler 408, a splitter 410, a signal adder 412, a multitap phase/amp 414, a receive signal sampler 416, and a channel estimator 418. Tx power amplifier 406 amplifies the transmission signal which is sampled by the transmission signal sampler 408. The transmission signal sampler 408 provides the sampled signal to a splitter 410 that provides the transmission sampled signal to the multitap phase/amp 414 and to the channel estimator 418. In an embodiment, circulator 404 is a 3 port circulator that transmits the transmission signal received on the transmission port to the antenna 402 and transmits a received signal received form the antenna 402 on the antenna port to the receiver. Receive signal sampler 416 samples the received signal and provides it to the channel estimator 418. The channel estimator 418 determines an error function from the samples transmitted signal and the sampled received signal and uses the error function to drive the amplitude and phase controls of each tap in the multitap 414 in such a way as to minimize the transmit signal appearing at the receiver. The multiple taps in multitap 414 includes a plurality of amplitude, phase, and delay adjusters each with different amplitude, phase, and delay shifts which may be implemented discretely or as a vector modulator. In an embodiment, it is not necessary to provide for variable delay. Rather, it is only necessary that the delay in each tap be different from the delay in the other taps and be of the same order of magnitude as the actual path delays associated with the various reflections appearing in the antenna path. The output of the multitap phase/amp 414 is added back into the received signal with the signal adder 412 to reduce or substantially minimize the appearance of the transmit signal at the receiver.

Figure 5:
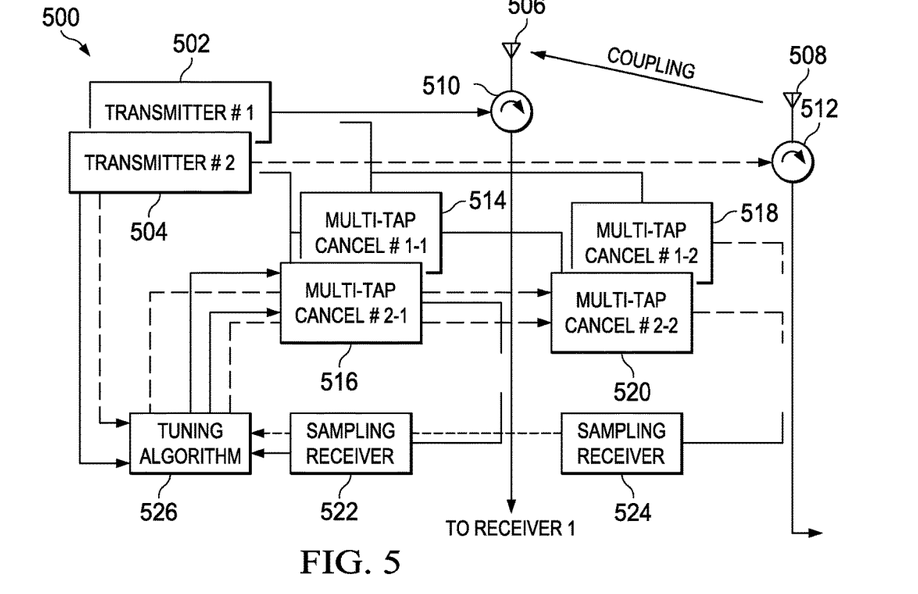
FIG. 5 is a schematic diagram illustrating an embodiment cancellation system for a MIMO system.

FIG. 5 is a schematic diagram illustrating an embodiment cancellation system 500 for a MIMO system. Cancellation system 500 includes two transmitters 502, 504, two antennas 506, 508, two circulators 510, 512, and two multi-tap cancellation components 514, 516, 518, 520 per received signal (one each for each transmitter for each received signal path). Additionally, the cancellation system 500 includes a sampling receiver 522, 524 for each received signal path and a tuning algorithm 526. In an embodiment, each of circulators 510, 512 include three ports—a transmitter port, an antenna port, and a receiver port. In an embodiment, there is radiative coupling between the two antennas 506, 508. In an embodiment, each of the multi-tap cancellation components 514, 516, 518, 520 is implemented as multitap cancellation block 200 depicted in FIG. 2. In an embodiment, the two transmitters 502, 504 transmit on the same frequency. In an embodiment, transmitter #1 502 and the first receiver that is coupled to the first antenna 506 transmit and receive, respectively, on the same frequency. In an embodiment, transmitter #2 504 and the second receiver that is coupled to the second antenna 508 transmit and receive, respectively, on the same frequency. In an embodiment, all of the transmitters 502, 504 and receivers transmit and receive on the same frequency.

Transmitter #1 502 sends a first Tx signal to the transmitter port of circulator 510, which then transmits the first Tx signal to the antenna 506. Transmitter #2 504 sends a second Tx signal to the transmitter port of circulator 508, which then transmits the second Tx signal to the antenna 508. Samples of the first Tx signal are sent to the multi-tap cancellation component #1-1 514 for use in canceling the first Tx signal from the first received signal received at the first antenna 506. Samples of the first Tx signal are also sent to the multi-tap cancellation component #1-2 518 for use in canceling the first Tx signal from the second received signal received at the second antenna 508. Similarly, samples of the second Tx signal are sent to the multi-tap cancellation component #2-1 516 and to the multi-tap cancellation component #2-2 520 for use in canceling the second Tx signal from respective first and second received signals.

Sampling receiver 522 samples the first received signal and provides the sampled first received signal to the tuning algorithm 526. Similarly, sampling receiver 524 samples the second received signal and provides the sampled second received signal to the tuning algorithm 526. The tuning algorithm 526 receives the first and second transmitted signals from the transmitter #1 502 and transmitter #2 504. Using the first and second transmitted signals and the sampled first and second received signals, the tuning algorithm determines gain adjust values and phase adjust and/or delay adjust values for all of the multi-tap cancellation components 514, 516, 518, 520. In an embodiment, the gain and phase adjust values for multi-tap cancellation component #1-1 514 are determined according to the first transmitted signal and the sampled first received signal. The gain and phase adjust values for multi-tap cancellation component #2-1 516 are determined according to the second transmitted signal and the sampled first received signal. The gain and phase adjust values for multi-tap cancellation component #1-2 518 are determined according to the first transmitted signal and the sampled second received signal. The gain and phase adjust values for multi-tap cancellation component #2-2 520 are determined according to the second transmitted signal and the sampled second received signal. The gain and phase adjust values are determined such that the multi-tap cancellation components 514, 516, 518, 520 provide add-in signals to the signals received at the antennas 506, 508 such that transmitted signals leaking into the received signals are substantially subtracted out of the received signal. The transmitted signals may lead into the received signals due to reflection at the antennas 506, 508. Also, due to radiative coupling (electromagnetic coupling) between the antennas 506, 508, the first transmitted signal may leak into the second received signal and the second transmitted signal may leak into the first received signal. In an embodiment, the tuning algorithm 526 also determines delay shift values. However, in general, it is not necessary to provide for adjustable delay, but rather, in an embodiment, it is sufficient only that the delay in each tap be different and of the same order of magnitude as the actual path delays associated with the various reflections appearing in the antenna path. The result of the added signals is to substantially minimize or eliminate the transmit signals appearing at the receiver.

In an embodiment, the transmitted signals, received signals, and added signals generated by the multi-taps 514, 516, 518, 520 are all RF signals. Thus, in an embodiment, the cancellation procedure is performed in the RF or analog domain and not in a digital domain.

Although described with reference to two transmitters, two antennas, and two receivers, the disclosed systems, methods, and apparatuses described in FIG. 5 are applicable to systems having more than two transmitters, antennas, and receivers. In general, in an embodiment, the number of multi-tap cancellation components for a transmitter, antenna, receiver grouping is equal to the total number of transmitters in the system. Thus, for example, a system that includes four transmitters, four antennas, and four receivers includes four multi-tap cancellation components for each transmitter (i.e., 16 total multi-tap cancellation components)—one multi-tap cancellation component for each transmitter per receiver.

Figure 6:
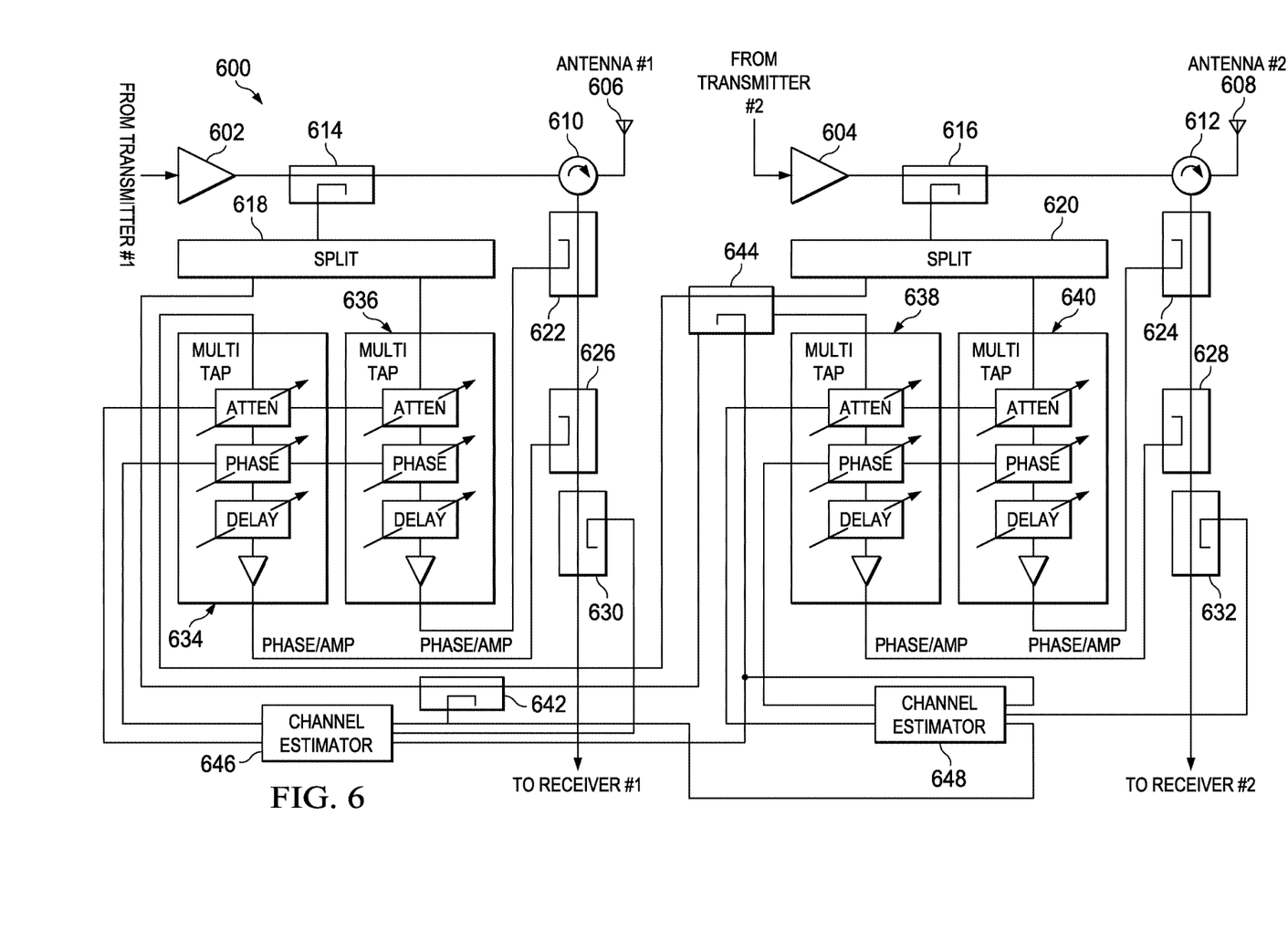
FIG. 6 is a schematic diagram illustrating another embodiment cancellation system 600 for a MIMO system.

FIG. 6 is a schematic diagram illustrating another embodiment cancellation system 600 for a MIMO system. System 600 includes two transmitter amplifiers 602, 604, two antennas 606, 608, two circulators 610, 612, two transmitted signal samplers 614, 616, two splitters 618, 620, four signal adding components 622, 624, 626, 628, two received signal samplers 620, 632, four multi-tap components 634, 636, 638, 640, two split transmitted signal sampler 642, 644, and two channel estimators 646, 648. There are two multi-tap components 634, 636 for receiver #1 (not shown) and two multi-tap components 638, 640 for receiver #2 (not shown). The sampled first transmitted signal sampled by transmitted signal sampler 614 is split by splitter 618 and one copy of the first transmitted signal is provided to multi-tap component 636 and the other copy is provided to multi-tap component 638. Split transmitted signal sampler 642 samples one of the copies of the first transmitted signal and provides it as an input to channel estimator 646 and as an input to channel estimator 648. The second transmitted signal is similarly sampled, split, and provided to multi-tap 634 and multi-tap 640 and to the two channel estimators 646, 648. Channel estimator 646 also receives a sampled first received signal from received signal sampler 630 and uses the sampled first received signal and the first and second transmitted signals to determine the phase, gain, and/or delay adjusts for each of the multi-taps 634, 636 and provides these phase, gain, and/or delay adjust values to the multi-taps 634, 636. Similarly, the channel estimator 648 uses the sampled second received signal provided by the second received signal sampler 632 as well as the first and second transmitted signals to determine gain and phase adjust values for multi-taps 638 and 640. The gain, phase, and/or delay adjust values are determined such that, when the signals from the multi-taps 634, 636, 638, 640 are added to the respective antenna 606, 608 received signal paths, the transmitted signals appearing at the receiver is substantially minimized or eliminated. In general, it is not always necessary to provide for adjustable delay, but rather, in an embodiment, it is sufficient only that the delay in each tap be different and of the same order of magnitude as the actual path delays associated with the various reflections appearing in the antenna path.

Figure 7:
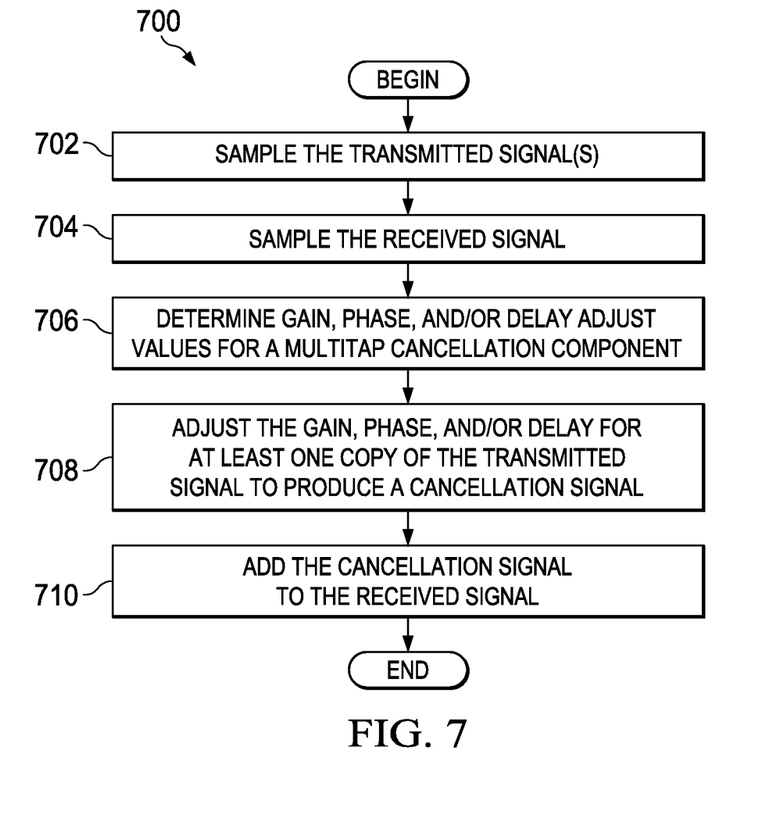
FIG. 7 is a flowchart illustrating an exemplary method for cancelling or reducing the transmission signal at a receiver.

FIG. 7 is a flowchart illustrating an exemplary method 700 for cancelling or reducing the transmission signal at a receiver. Method 700 may be implemented in AP 110 in FIG. 1. Method 700 begins at block 702 where the radio samples transmitted signal. At block 704, the radio samples the received signal. At block 706, the radio determines the gain and phase adjust values for a multitap cancellation component. The multitap cancellation component may be implemented as, for example, multitap cancellation block 200 illustrated in FIG. 2. In an embodiment, the gain and phase adjust values are determined by a tuning algorithm or an error estimation block. At block 708, the gain and phase for at least one copy of the transmitted signal is adjusted according to the determined gain and phase adjust values to produce a cancellation signal. In an embodiment, the transmitted signal is split into a plurality of signals corresponding to different reflections identified in the received signal and the gain and phase adjust values are determined for each of the plurality of split transmitted signals such that each reflected transmitted signal is cancelled (or substantially removed) from the received signal when the cancellation signal is added to the received signal. At block 710, the cancellation signal is added to the received signal to eliminate, reduce, or otherwise mitigate the appearance of the transmitted signal at a receiver. The gain and phase values are selected such that when the cancellation signal is added to the received signal, the transmitted signal has been reduced or eliminated from the resultant received signal. In an embodiment, the method is performed on analog signals. In an embodiment, when there are multiple transmitters and multiple receivers, the method 700 is performed on each received signal to reduce, mitigate, or eliminate the transmitted signal from each of the transmitters from each received signal.

Figure 8:
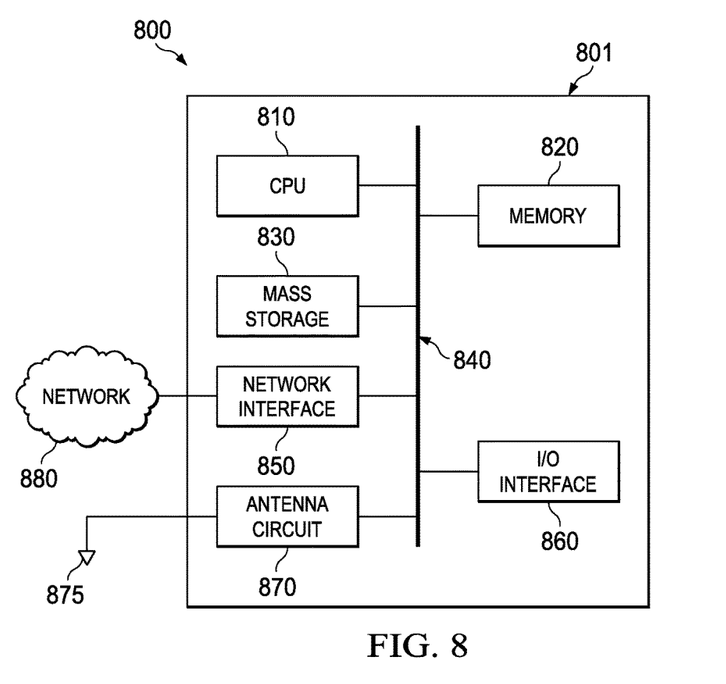
FIG. 8 is a processing system that can be used to implement various embodiments.

FIG. 8 is a block diagram of a processing system 800 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 800 may comprise a processing unit 801 equipped with one or more input/output devices, such as a speaker, microphone, mouse, touchscreen, keypad, keyboard, printer, display, and the like. The processing unit 801 may include a central processing unit (CPU) 810, memory 820, a mass storage device 830, a network interface 850, an I/O interface 860, and an antenna circuit 870 connected to a bus 840. The processing unit 801 also includes an antenna element 875 connected to the antenna circuit.

The bus 840 may be one or more of any type of several bus architectures including a memory bus or memory controller, a peripheral bus, video bus, or the like. The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs.

The mass storage device 830 may comprise any type of storage device configured to store data, programs, and other information and to make the data, programs, and other information accessible via the bus 840. The mass storage device 830 may comprise, for example, one or more of a solid state drive, hard disk drive, a magnetic disk drive, an optical disk drive, or the like.

The I/O interface 860 may provide interfaces to couple external input and output devices to the processing unit 801. The I/O interface 860 may include a video adapter. Examples of input and output devices may include a display coupled to the video adapter and a mouse/keyboard/printer coupled to the I/O interface. Other devices may be coupled to the processing unit 801 and additional or fewer interface cards may be utilized. For example, a serial interface such as Universal Serial Bus (USB) (not shown) may be used to provide an interface for a printer.

The antenna circuit 870 and antenna element 875 may allow the processing unit 801 to communicate with remote units via a network. In an embodiment, the antenna circuit 870 and antenna element 875 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. Additionally, in some embodiments, the antenna circuit 870 operates in Full Duplex (FD) mode. In some embodiments, the antenna circuit 870 and antenna element 875 may also provide Bluetooth and/or WiFi connection to other devices. In an embodiment, the antenna circuit 870 includes a transmitted signal cancellation system, such as, for example, any of systems 300, 400, 500, or 600.

The processing unit 801 may also include one or more network interfaces 850, which may comprise wired links, such as an Ethernet cable or the like, and/or wireless links to access nodes or different networks. The network interface 801 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A system for minimizing transmitted signals from a transmitter appearing at a co-located receiver in a division free duplexing radio, the system comprising:

a plurality of transmitters to transmit a plurality of analog transmitted signals according to respective ones of a plurality of baseband transmission signals;

a plurality of receivers to receive a plurality of analog received signals;

a plurality of antennas each coupled to a respective one of the transmitters and a respective one of the receivers;

a plurality of circulators each coupled to a respective one of the transmitters, a respective one of the antennas, and a respective one of the receivers;

an algorithm tuner configured to receive copies of the baseband transmission signals from the transmitters and sampled analog received signals from received signal paths from the circulators, each sampled analog received signal being sampled at a point in a respective received signal path before a corresponding analog received signal is provided to a corresponding one of the receivers, the algorithm tuner further configured to determine a plurality of phase parameters and a plurality of attenuation parameters in an analog domain for each received signal according to the plurality of baseband transmission signals; and a plurality of multitap cancellers each coupled to the algorithm tuner and configured to receive the plurality of phase parameters and the plurality of attenuation parameters, the multitap cancellers each further configured to determine a cancellation signal according to the plurality of phase parameters and the plurality of attenuation parameters in the analog domain and to provide a cancellation signal to couple to the analog received signal for each received signal such that an amount of the analog transmitted signal appearing at each of the receivers is reduced.

2. The system of claim 1, further comprising a plurality of cancellation couplers each coupled to an output of a respective one of the multitap cancellers and to a respective one of the received signal paths, wherein the each multitap canceller is configured to receive a copy of the analog transmitted signals and to receive gain, phase, and/or delay adjust values from the algorithm tuner, and configured to provide a cancellation signal according to the analog transmitted signal and the gain, phase, and/or delay adjust values to a cancellation coupler that couple the cancellation signal to the analog received signal.

3. The system of claim 2, wherein the algorithm tuner is configured to determine the gain, phase, and/or delay adjust values such that a component of the analog transmitted signal appearing at the receiver is reduced.

4. The system of claim 2, wherein the each cancellation coupler is configured to couple the cancellation signal to the received signal at a point upstream from the point in the received signal path at which the received signal is sampled.

5. The system of claim 1, wherein a number of multitap cancellers per receiver is equal to a number of transmitters.

6. The system of claim 5, wherein each of the multitap cancellers is configured to provide a cancellation signal to one of the receivers for one of the transmitters.

7. The system of claim 1, wherein the each multitap canceller comprises at least one gain adjuster and at least one phase adjuster.

8. A network component configured for division free duplexing in a wireless network, comprising:
  a processor;
  a plurality of transmitters coupled to the processor to transmit a plurality of analog transmitted signals according to respective ones of a plurality of baseband transmission signals as instructed by the processor;
  a plurality of receivers to receive a plurality of analog received signals;
  a plurality of antennas each coupled to a respective one of the transmitters and a respective one of the receivers;
  a plurality of circulators each coupled to a respective one of the transmitters, a respective one of the antennas, and a respective one of the receivers;
  an algorithm tuner configured to receive copies of the baseband transmission signals from the transmitters and sampled analog received signals from received signal paths from the circulators, wherein each of the sampled analog received signals is sampled at a point in a respective received signal path before a corresponding analog received signal is provided to a receiver corresponding one of the receivers, the algorithm tuner further configured to determine a plurality of phase parameters and a plurality of attenuation parameters in an analog domain for each received signal according to the plurality of baseband transmission signals; and
  a plurality of multitap cancellers each coupled to the algorithm tuner and configured to receive the plurality of phase parameters and the plurality of attenuation parameters, the multitap cancellers each further configured to determine a cancellation signal according to the plurality of phase parameters and the plurality of attenuation parameters in the analog domain and to provide a cancellation signal to couple to the analog received signal for each received signal such that an amount of the analog transmitted signal appearing at each of the receivers is reduced.

9. The network component of claim 8, further comprising a plurality of cancellation couplers each coupled to an output of a respective one of the multitap cancellers and to a respective one of the received signal paths, wherein each of multitap cancellers is configured to receive a copy of the analog transmitted signal signals and to receive gain, phase, and/or delay adjust values from the algorithm tuner, and configured to provide a cancellation signal according to the analog transmitted signal and the gain, phase, and/or delay adjust values to a cancellation coupler that couple the cancellation signal to the analog received signal.

10. The network component of claim 9, wherein the algorithm tuner is configured to determine the gain, phase, and/or delay adjust values such that a component of the analog transmitted signal appearing at the receiver is reduced.

11. The network component of claim 9, wherein the each cancellation coupler is configured to couple the cancellation signal to the received signal at a point upstream from the point in the received signal path al which the received signal is sampled.

12. The network component of claim 8, wherein a number of multitap cancellers per receiver is equal to a number of transmitters.

13. The network component of claim 12, wherein each of the multitap cancellers is configured to provide a cancellation signal to one of the receivers for one of the transmitters.

14. The network component of claim 8, wherein the each multitap canceller comprises at least one gain adjuster and at least one phase adjuster.

15. The network component of claim 8, wherein the network component is configured for multiple-input multiple-output (MIMO) division free duplexing.

16. A method for cancelling a transmitted signal from a received signal in a division free duplexing network component, the method comprising:
  sampling a plurality of baseband transmitted signals;
  sampling a plurality of analog received signals;
  determining in an analog domain, with the network component, a plurality of gain and phase adjust values by which to modify a plurality of analog transmitted signals for the plurality of baseband transmitted signals, each of the plurality of gain and phase adjust values corresponding to a different one of the plurality of analog transmitted signals, and each of the plurality of gain and phase adjust values determined according to the plurality of baseband transmitted signals;
  modifying in an analog domain, with a cancellation component in the network component, each of the plurality of analog transmitted signals to produce a cancellation signal according to the plurality of gain and phase adjust values for each of the plurality of analog received signals; and
  adding a respective cancellation signal to each of the analog received signals at a point in a received signal path between an antenna and a receiver.

17. The method of claim 16, wherein the sampling of each of the analog received signals is performed at a point between the point in the respective received signal path that the respective cancellation signal is added to the respective received signal and the respective receiver.

18. The method of claim 16, further comprising splitting each of the analog transmitted signals into a plurality of split analog transmitted signals and adjusting a gain and phase of each split analog transmitted signal to produce a plurality of modified transmitted signals.

19. The method of claim 18, further comprising combining, for each corresponding analog received signal, the plurality of modified transmitted signals to produce the cancellation signal for the corresponding analog received signal.

\* \* \* \* \*

UNITED STATES PATENT AND TRADEMARK OFFICE
CERTIFICATE OF CORRECTION

PATENT NO. : 10,205,585 B2
APPLICATION NO. : 14/496850
DATED : February 12, 2019
INVENTOR(S) : James Gary Griffiths et al.

Page 1 of 1

It is certified that error appears in the above-identified patent and that said Letters Patent is hereby corrected as shown below:

On the Title Page

Item (74) Attorney, Agent, or Firm, Line 1, delete "Mastil" and insert --Matsil--.

In the Claims

In Column 12, Line 18, Claim 11, delete "signal path al which" and insert --signal path at which--.

Signed and Sealed this
Twenty-sixth Day of March, 2019

Andrei Iancu
*Director of the United States Patent and Trademark Office*